United States Patent [19]
Bril et al.

[11] Patent Number: 5,742,298
[45] Date of Patent: Apr. 21, 1998

[54] 64 BIT WIDE VIDEO FRONT CACHE

[75] Inventors: Vlad Bril, Campbell; Dwarka Partani, Fremont, both of Calif.

[73] Assignee: Cirrus Logic, Inc., Fremont, Calif.

[21] Appl. No.: 514,887

[22] Filed: Aug. 14, 1995

Related U.S. Application Data

[63] Continuation-in-part of Ser. No. 176,563, Dec. 30, 1994, Pat. No. 5,539,428.

[51] Int. Cl.⁶ .................................................. G09G 5/22
[52] U.S. Cl. .......................... 345/501; 345/193; 345/195; 345/467; 395/110
[58] Field of Search ........................... 345/143, 193, 345/195, 141, 142, 144, 192, 194, 507, 510, 520, 467, 468; 395/110, 115, 116, 507, 510, 520; 382/198, 200; 364/DIG. 1

[56] References Cited

U.S. PATENT DOCUMENTS

| | | | |
|---|---|---|---|
| 4,345,244 | 8/1982 | Greer et al. | 340/728 |
| 4,486,856 | 12/1984 | Heckel et al. | 345/193 |
| 4,587,629 | 5/1986 | Dill et al. | 364/900 |
| 4,847,758 | 7/1989 | Olson et al. | 364/200 |
| 4,849,747 | 7/1989 | Ogawa et al. | 340/735 |
| 4,868,554 | 9/1989 | Aoki et al. | 340/735 |
| 4,937,565 | 6/1990 | Suwannukul | 340/735 |
| 5,043,712 | 8/1991 | Kihara et al. | 340/735 |
| 5,159,676 | 10/1992 | Wicklund et al. | 395/425 |
| 5,208,908 | 5/1993 | Harrison et al. | 395/150 |
| 5,243,703 | 9/1993 | Farmwald et al. | 395/325 |
| 5,265,236 | 11/1993 | Mehring et al. | 395/425 |
| 5,539,428 | 7/1996 | Bril et al. | 345/143 |

FOREIGN PATENT DOCUMENTS 6242769 9/1994 Japan.

*Primary Examiner*—Dennis-Doon Chow
*Attorney, Agent, or Firm*—Robert P. Bell; Steven A. Shaw

[57] ABSTRACT

A VGA compatible graphics controller receives character data, attribute data and font data, each of which are stored in different planes of a display memory. The font data comprises bit maps of at least two character fonts, which may be user fonts or default fonts loaded from a controller BIOS. The video controller detects attempts by a host CPU to write data into plane two of display memory (where character font bit maps reside). The address generated by the host CPU is scrambled to produce a video font cache address. The character font bit maps are stored in a video font cache at the scrambled address. The font select bits of the CPU generated address are used as a byte select to store a particular font at a byte location at a selected video font cache address. In the preferred embodiment, eight fonts may be stored in the video font cache, one scan line each font of each character as a different byte at each address of the video font cache in a 64 bit wide DRAM.

16 Claims, 6 Drawing Sheets

| | FONT 0 | FONT 1 | FONT 2 | FONT 3 | FONT 4 | FONT 5 | FONT 6 | FONT 7 | |
|---|---|---|---|---|---|---|---|---|---|
| 3BFFF | SCANLN 1F | SCANLN 1F | • | • | • | • | • | SCANLN=1F | ASCII = FF |
| 3BFFE | SCANLN 1F | SCANLN 1F | • | • | • | • | • | SCANLN=1F | ASCII = FE |
| 3BFFD | SCANLN 1F | SCANLN 1F | • | • | • | • | • | SCANLN=1F | ASCII = FD |
| ⋮ | • • • • | • • • • | • • • • | | | | • • • • | • • • • | |
| 3A100 | SCANLN=1 | SCANLN=1 | SCANLN =1 | SCANLN=1 | SCANLN=1 | SCANLN=1 | SCANLN=1 | SCANLN=1 | ASCII = 00 |
| 3A0FF | SCANLN=0 | SCANLN =0 | SCANLN=0 | SCANLN=0 | SCANLN=0 | SCANLN=0 | SCANLN=0 | SCANLN=0 | ASCII = FF |
| ⋮ | • • • | • • • | • • • | | | | • • • | • • • | |
| 3A002 | SCANLN=0 | SCANLN= 0 | • | • | • | • | • | SCANLN=0 | ASCII = 02 |
| 3A001 | SCANLN=0 | SCANLN=0 | • | • | • | • | • | SCANLN=0 | ASCII = 01 |
| 3A000 | SCANLN=0 | • | • | • | • | • | • | SCANLN=0 | ASCII = 00 |
| | BYTE 0 | BYTE 1 | BYTE 2 | BYTE 3 | BYTE 4 | BYTE 5 | BYTE 6 | BYTE 7 | |

Figure 4

64 BIT WIDE VIDEO FRONT CACHE

CROSS-REFERENCE TO RELATED APPLICATIONS

This application is a Continuation-In-Part (CIP) of U.S. patent application Ser. No. 08/176,563, entitled "VIDEO FONT CACHE", filed Dec. 30, 1994, now U.S. Pat. No. 5,539,428, incorporated herein by reference.

FIELD OF THE INVENTION

The present invention relates to an apparatus and method for generating display characters with a video controller in text mode using a video font cache.

BACKGROUND OF THE INVENTION

Video controller integrated circuits (ICs) are known in the art for controlling video displays such as CRTs and flat panel displays. Such video controller ICs are typically incorporated into video controllers (e.g., MDA, CGA, EGA, VGA or the like) for use in computer systems (e.g., IBM™ PC or the like). Such video controllers may also incorporate a video memory (VMEM) for storing video information for forming a video display.

FIG. 3 is a block diagram illustrating an example of a prior art video controller IC 101 which is presented here for purposes of illustration only. The present invention may also be applied to other types of video controller ICs without departing from the spirit or scope of the present invention. The operation of such prior art video controllers is well known in the art and is described, for example, in *Programmer's Guide to the EGA and VGA Cards*, by Richard F. Ferraro (©1990, Addison-Wesley Publishing Company) and incorporated herein by reference.

Referring now to FIG. 3, system control, address, and data may be written from a host CPU (not shown) through CPU interface 120. Display data, comprising graphics and/or character data, may be written to an external video or display memory (not shown) through memory controller 116 during a CPU write cycle. Memory controller 116 may retrieve display data from the video or display memory (not shown), and through FIFO 118, attribute controller 121 and video output 123 output a display signal to a display (not shown) at the characteristic refresh rate of that display.

It should be noted that the term "video memory" although well known in the art, may be a misnomer. With the advent of full motion video in computer displays, the terms "video memory", "video display" or the like may be confusing. Moreover, in VGA controllers, "video memory" may generally comprise a single-port dynamic random access memory (DRAM), not to be confused with custom multiport video RAMs commercially available. The term "display memory" will be used henceforth in the present application to describe DRAMs or memories used in connection with a video controller.

Video controllers typically use one of two modes to display information on a video display. A graphics mode may be used to display graphics information (e.g., drawings, pictures, or the like) from information typically stored as a bit map in the display memory. Such graphics information may be typically stored in the display memory, arranged into four bit planes. An alphanumeric (or text) mode may also be provided to display text only (or primitive graphics produced from text-like characters). Although alphanumeric modes are not as versatile as graphics modes, they may be faster in terms of screen refresh rates, at least historically.

Moreover, an alphanumeric mode is a requirement in order to be fully compatible with the VGA standard. Thus, a fully VGA compatible video controller must provide VGA compatible alphanumeric modes.

In a video controller IC, graphics modes may require large amounts of memory to display information, along with long refresh times. In order to quickly process alphanumeric characters, alphanumeric modes are provided to compress the amount of data needed for each screen by providing a character set font bit map describing the pixel arrangement of each character in a character set. FIG. 2 shows how the display memory of a typical VGA controller is arranged in an alphanumeric mode.

Alphanumeric characters may be displayed in a variety of colors or various monochrome attributes. In monochrome modes, characters may be represented in low or high intensity, in reverse intensity, with underlines, or blinking. In color alphanumeric modes, one of a number (e.g., 16) of colors may be selected for the foreground, and another for the background of each character. In addition, the characters in the color mode may be commanded to blink or be underlined. In either color or monochrome mode, one byte may be used for each character as a character attribute and may be stored in plane 1 of the display memory as shown in FIG. 2.

A character code may comprise one byte of data, typically an ASCII code describing the character. For example ASCII code 64 (Decimal) would represent the character "A". For a one byte character code, each character code may take any of 256 values (e.g., 00 (Hex) to FF (Hex)) in a character set, requiring eight bits (one byte) for each character. These character codes may be stored in plane 0 of the display memory as shown in FIG. 2.

The shape or font for each of the 256 characters, which may be generated from the character codes, may be stored as a character bit map in plane 2 as shown in FIG. 2. Two or more character set font bit maps may be stored in memory. Typically, two "local" default character set font bit maps may be stored in BIOS ROM in a video controller IC. Additional "user" character set font bit maps may be loaded from RAM by a user. Under the traditional VGA standard, two character sets may be active at one time, providing a total of 512 characters which may be displayed. Each font bit map describes the shape of each character in a pixel map, where one bit represents one pixel.

Different character sets may have different numbers of pixels per character. For example, in an EGA display, three character sets of resolutions may be provided, 8×8 pixels, 8×14 pixels (as shown in FIG. 1) and 9×14 pixels. Typical VGA displays support 8×8, 8×14, 8×16, 9×14 and 9×16 pixels characters.

Each character may be represented in memory by a group of bytes, each byte typically representing a horizontal scan line. The total number of bytes may represent the overall height of the character. For example, the character shown in FIG. 1 may be stored as a bit map comprising fourteen bytes, each byte representing one scan line of the character "Z". The contents of byte 2, for example, would be FF (hex) or 11111111. The contents of byte 6 would be 18 hex, or 00011000. In most VGA/EGA controllers, 32 bytes may be reserved for each character regardless of the number of actual bytes used for the bit map of the character. Thus, a character set of 256 characters will require 8192 bytes, or 8 KB, of memory space.

Other types of bit mapping are possible. For example, some video controllers reverse the LSB and MSB. Further, for pixel resolutions greater than eight bits per scan line per character, more than one byte may be used per scan line of a character.

In the alphanumeric mode, most VGA or EGA video controller ICs do not utilize the fourth plane of the display memory, as shown in FIG. 2. This fourth plane may be used for specialized expansion modes, or, as discussed below, for mirroring the contents of plane 2 to place the character font bit maps in page mode.

As can be seen from the memory map of FIG. 2, a string of characters and character attributes may be quickly read from planes 0 and 1 (even and odd addresses). In order to access the corresponding bit maps for each character, however, a more complex memory access must be made.

For example, each character bit map may be located in plane 2 by a character shape address which may consist of a character base address plus the font character code. The byte at that address, followed by the next 13 bytes (using the 8×14 resolution example shown in FIG. 1), represent the character font bit map for one character.

However, in order for the video controller to assemble a scan line of characters, these character maps cannot be addressed sequentially. Thus, in order to draw three characters, the video controller must first retrieve the first byte of character one, the first byte of character two and then the first byte of character three in order to draw the first scan line. For the second scan line, the video controller must retrieve the second byte of character one, the second byte of character two, and the second byte of character three. This process would be repeated for all fourteen character lines (as shown in the example in FIG. 1). Thus, the video controller must randomly access the display memory to retrieve the character font bit maps. As computer speeds (clock rates) and video refresh rates have increased, this prior art technique for generating alphanumeric characters may be inadequate for high speed generation of text characters.

In prior art video controllers, individual font bit maps may be located in plane 2 of the display memory, arranged in sequential order, in 32 byte blocks. Thus, in order to access individual scan lines of a font bit map, a series of random memory accesses must be made. To fetch the ASCII and attribute bytes (which are located at sequential addresses), the memory may be accesses in page mode, which may, for example, take 50 ns for one page cycle. In order to retrieve one byte of a character font bit map, plane 2 of the display memory must be accessed in a random cycle which may take 250 ns. Thus, the fetch time for one byte of the character font bit map may take five times as long as the page mode fetch of the ASCII character and attribute data.

One solution to this problem is to place the entire set of fonts in page mode. That is, it may be possible to write the contents of plane 2 of the display memory in to plane 3 of the display memory (or to some other memory location) and reload the fonts in a page mode into plane 2. In page mode, the fonts are arranged by scan line, rather than by ASCII character order. Thus, a first page of a character font bit map may contain 256 bytes, each byte representing the first scan line of each of the 256 characters. The second page of the character font bit map may contain 256 bytes, each byte representing the second scan line of each of the 256 characters. For a 14 line character such as shown in FIG. 1, fourteen pages of page addressable memory may be used to page fonts.

Using the paged font technique, one page access may be made to plane 2 of the display memory to retrieve all the relevant scan lines of all 256 characters, which can be assembled to produce a scan line for the video display using the ASCII and attribute information from planes 0 and 1 of the display memory.

Unfortunately, this technique suffers from at least two drawbacks. First, the technique is not fully VGA compatible. Since a user may load fonts into the display memory, it is possible that a conflict will arise if the user attempts to load an unpaged font into the display memory set up for paged fonts. Second, the paged font technique discussed above allows for only one font to be displayed at any given time on the screen, since in the page mode of access, all relevant scan lines of each of the 256 characters are retrieved at once.

The present invention overcomes these difficulties by providing a page mode access to allow more than one video font to be used at one time without unduly slowing down the video controller.

SUMMARY AND OBJECTS OF THE INVENTION

It is an object of the present invention to quickly generate alphanumeric characters for display on a video display.

It is another object of the present invention to quickly and selectively generate at least two fonts simultaneously in an alphanumeric mode on a video display.

It is a further object of the present invention to provide at least two fonts in a page mode for selective display on a video display.

It is a further object of the present invention to provide all eight resident fonts in a VGA text mode in a paged format in off-screen memory such that any of the eight resident fonts may be selected and displayed without reformatting or repaginating the fonts.

These and other objects may be achieved by the present invention comprising a video controller for receiving alphanumeric character data and generating alphanumeric characters on a video display. A display memory stores alphanumeric character data, each of the alphanumeric character data representing at least one character of a character set, character attribute data including at least font selection data, and at least two character font bit maps, each of the at least two character font bit maps representing a display font. A video font cache stores the at least two character font bit maps in a page mode. A display memory controller, coupled to the display memory, the video font cache, and a host CPU, receives from the host CPU data representing at least one scan line of a character font bit map, stores the data representing at least one scan line of a character font bit map in a first memory cycle in the display memory at an address indicated by the host CPU, translates the address indicated by the host CPU into a video font cache address, and stores, in a subsequent memory cycle, the data representing at least one scan line of a character font bit map at the video font cache address.

The display memory controller may receive font select data as a portion of the address indicated by the CPU and store the data representing at least one scan line of a character font bit map at the video font cache address at a byte selected by the font select data. The display memory may comprise at least one DRAM having a width of at least 64 bits, and the at least two character font bit maps may comprise eight character font bit maps, one scan line for one character of each of the eight character font bit maps being stored as a different byte at one memory address in the video font cache. The address indicated by the host CPU may comprise font select bits, character select bits, and scan line select bits. The video font cache address may comprise a video font cache offset address, the scan line select bits, and the character select bits. The select bits may be used as a byte select mask to store the data representing at least one scan line of a character font bit map at a selected byte in the video font cache at the video font cache address.

A first retrieval means may retrieve from an address in the video font cache, data representing one scan line for one character for each of the at least two character font bit maps. A primary font selection means, may receive a primary font selection signal and select from the first retrieval means data representing one scan line for one character of a primary font. A secondary font selection means, may receive a secondary font selection signal and select from the first retrieval means data representing one scan line for one character of a secondary font. A display font means, coupled to the primary font selection means and the secondary font selection means, may receive from an attribute byte associated with a character a primary/secondary font selection signal and select from the primary font selection means and the secondary font selection means display data representing one scan line for one character of a selected display font.

BRIEF DESCRIPTIONS OF THE DRAWINGS

FIG. 4 is a font cache memory map of the present invention.

DETAILED DESCRIPTION OF THE INVENTION

In the present invention, character font bit maps are placed in a page mode. However, in order to provide VGA compatibility and the ability to display two fonts types on one display screen, the font cache is paged using a parallel technique containing all eight fonts. Video display controllers which are VGA compatible are capable of displaying up to two fonts at a time, from any two of up to eight fonts stored in display memory. The two fonts which are active or "on-line" are called the primary and secondary fonts. The eight available fonts may be referred to as "resident" fonts.

As discussed above, in many applications, a single scan line of a font bit map may comprise one byte (8 bits). Fonts with a larger number of pixels per scan line (e.g., 9) may also be represented using 8 bits by providing a hardware technique for generating the remaining ninth bit (which generally is left blank to provide space between the characters). Such a technique is discussed, for example, in *Programmer's Guide to the EGA and VGA Cards*, by Richard F. Ferraro (©1990, Addison-Wesley Publishing Company) and incorporated herein by reference. Other font bit maps may use more than one byte per scan line (e.g., 16 pixels per scan line represented by two bytes of eight bits each).

Figure 4:
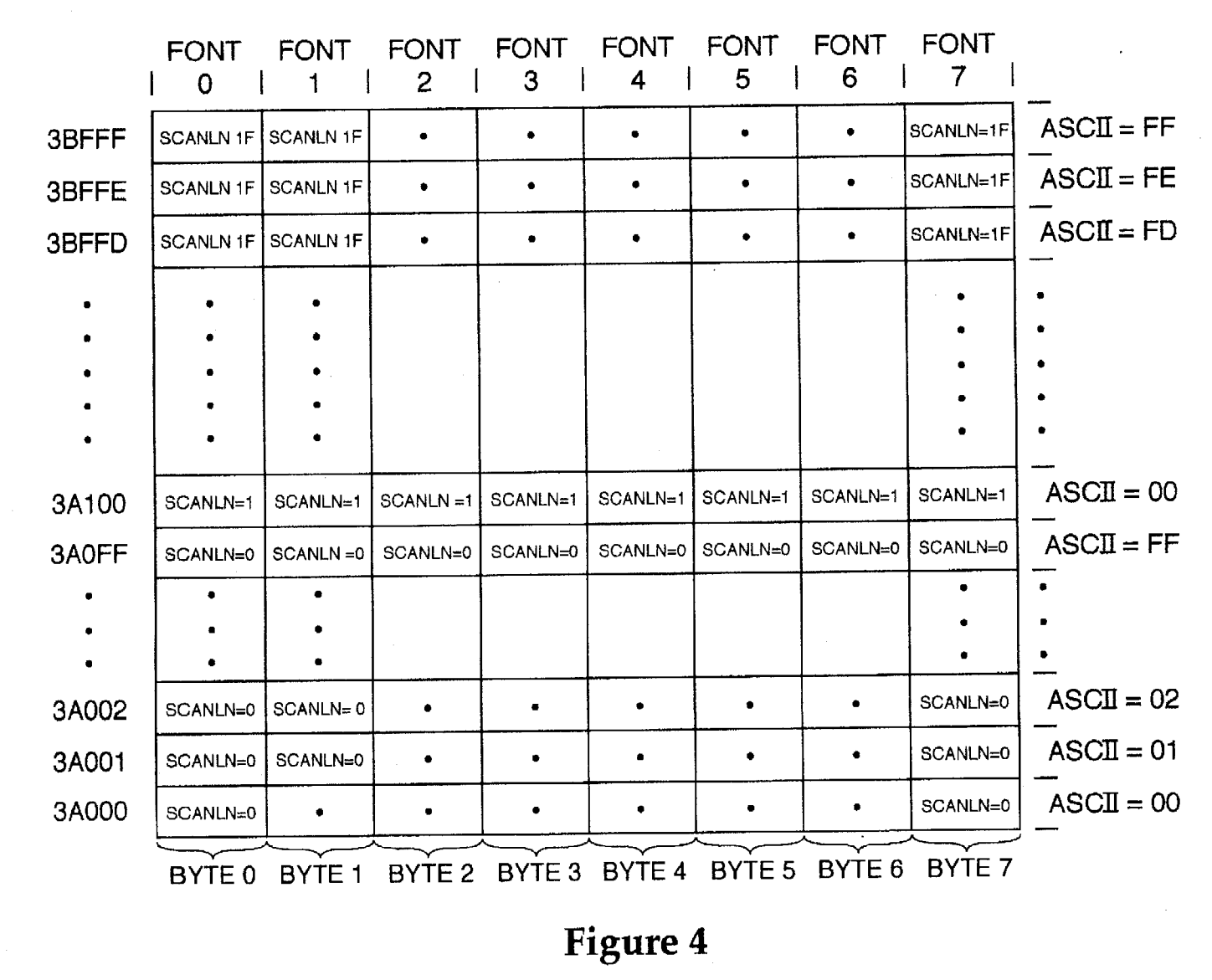

FIG. 4 shows a font cache memory map according to the present invention. For the purposes of illustration all eight resident fonts will be discussed as having eight pixels per scan line, or one byte per scan line. In the preferred embodiment, a memory having a width of at least 64 bits (i.e., one quad word or eight bytes) is used. At each memory address, eight bytes are stored, each of the eight bytes representing a scan line of a character font bit map for each of the eight resident fonts.

All eight fonts have been paged in a parallel fashion. Thus, for example, at memory address 3BFFF, the 32nd scan line (i.e., scan line 1F (hex)) for both all eight resident fonts for the 256th ASCII character in a character set (i.e., ASCII=FF(hex)) are stored. At the next sequential address, the 32nd scan line (i.e., scan line 1F (hex)) for all eight resident fonts for the 255th ASCII character in a character set (i.e., ASCII=FE(hex)) are stored. Thus, the first page of the font cache memory may contain the 32nd scan lines for all 256 characters in a character set in all eight resident fonts.

The remaining 31 pages of the font cache memory are arranged in a similar manner, each providing a scan line byte for all 256 characters in a character set for in all eight resident fonts. Of course, as shown here, the last line (i.e., scan line 1F) is shown at the highest memory address. Other orderings may be used. For example, the first scan line (i.e., scan line 00) may be stored at the highest memory address. Similarly, the ordering of the ASCII character set may also be reversed or reordered.

Figure 5:
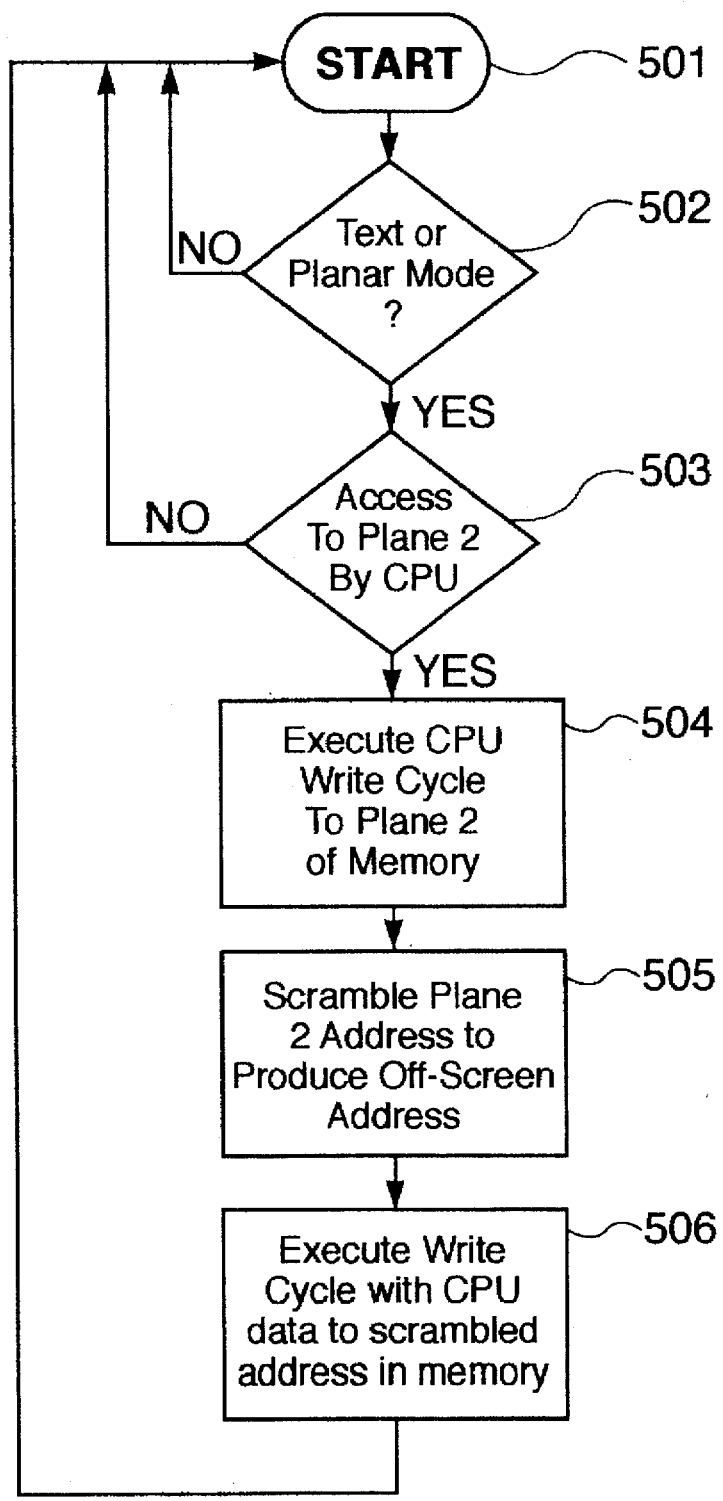
FIG. 5 is a flow chart showing the operation of the present invention.

FIG. 5 is a flow chart illustrating the process for creating the paginated fonts in off-screen memory. The flow chart of FIG. 5 may be implemented as a state machine in internal control logic of a video controller of the present invention. The implementation of such state machines is known in the art, and from the flow chart of FIG. 5 and the description of the present invention, one of ordinary skill in the art may be able to implement such a state machine.

Processing starts at start step 501. In step 502, the video controller IC of the present invention detects whether the IC is in a planar or text mode. If a planar or text mode is enabled, processing proceeds to step 503. In step 503, the video controller IC of the present invention detects any CPU access to plane 2 of display memory when in a planar mode or text mode. A CPU access to plane 2 of display memory when in planar or text mode may generally be characterized as an attempt by the CPU to load, update, or alter one of the 8 fonts available in a VGA text mode.

Each CPU access (typically a write operation) to plane 2 of display memory, having been detected may be executed as sequence of two CPU cycles. The first CPU cycle, in step 504 may comprise an access (e.g., write) of data to the display memory address indicated by the host CPU. Next, the display memory address indicated by the host CPU may be "scrambled" as will be discussed in more detail below, to produce a second, off-screen address, as indicated in step 505. This step of "scrambling" the address may be implemented by combinational logic circuitry, and thus may not incur an additional process step. In step 506, a second memory cycle may comprise another access (e.g., write) of the same data as in the first cycle to the second address in off-screen memory (i.e., to the video font cache).

In step 505, the display memory address indicated by the CPU is scrambled in a specific way such that data written by the CPU is automatically placed in an appropriate font area and scan line area of the off-screen font cache. Thus, the off-screen font cache may be dynamically and automatically updated when updated by the CPU. Moreover, by taking advantage of the increased width of newer DRAMs (e.g., 64 bits wide) all eight fonts in a VGA controller may be stored in the off-screen memory video font cache. Thus, if an alternate font is selected as one of the two resident fonts, the controller of the present application need not reformat and store that new font into the font cache.

Table I illustrates the structure of the CPU generated address used in step 504 to store one scan line of a video font in plane 2 of display memory. Normally the CPU address for font bit map scan line may be one sixteen-bit byte of addressing. Of this one address byte, font select comprises 3 bits. Since there are eight fonts supported in VGA, 3 font select bits provide $2^3$ or 8 font selections. Eight additional bits designate an ASCII character code. ASCII code typically supports $2^8$ or 256 characters. The remaining five bits represent scan line of the character. Although most characters may only be on the order of eight to sixteen lines tall, the VGA standard provides a total of 32 scan lines for each character. Thus, five scan line bits may be provided to designate $2^5$ or 32 different scan lines.

TABLE I

| CPU Generated Address | | |
|---|---|---|
| Bit Number | | |
| 15 \| 14 \| 13 \| 12 \| 11 \| 10 \| 09 \| 08 \| 07 \| 06 \| 05 \| 04 \| 03 \| 02 \| 01 \| 00 | | |
| FONT | ASCII CODE | SCAN LINE |
| 3 bits | 8 bits | 5 bits |

Figure 1:
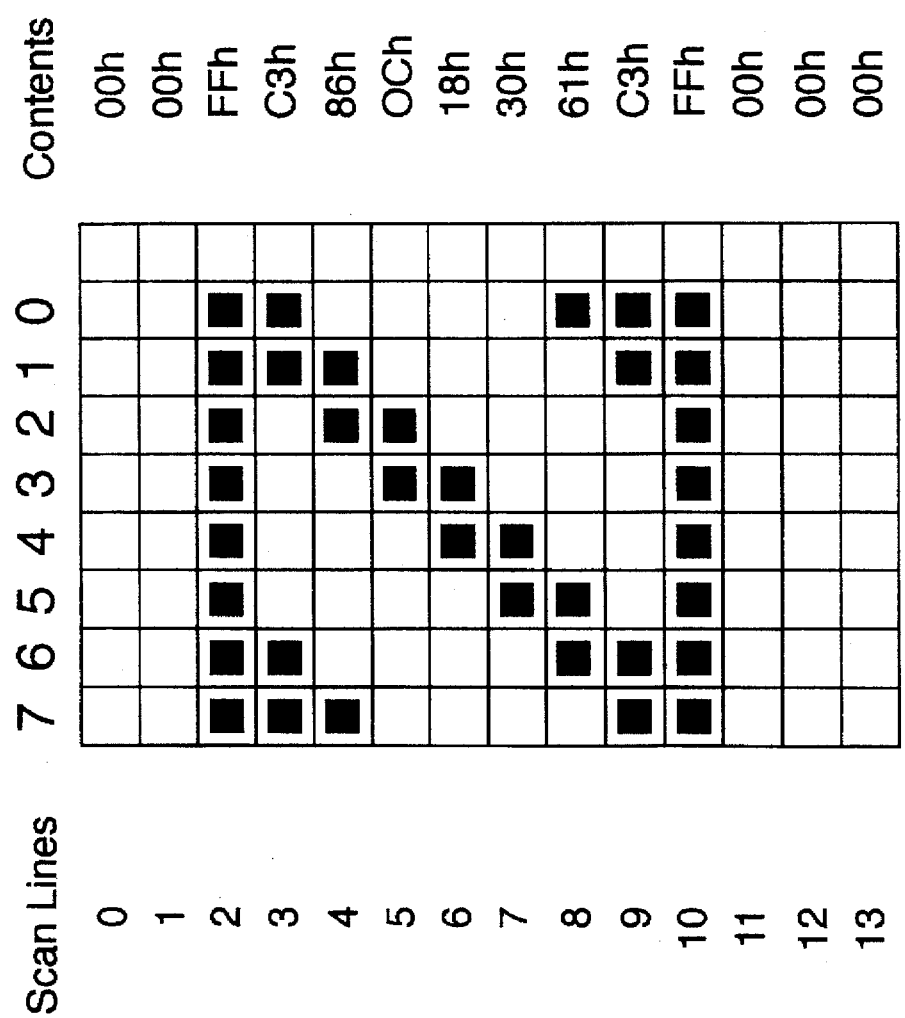
FIG. 1 is a Prior Art character font bit map for one character in a character set.
Figure 2:
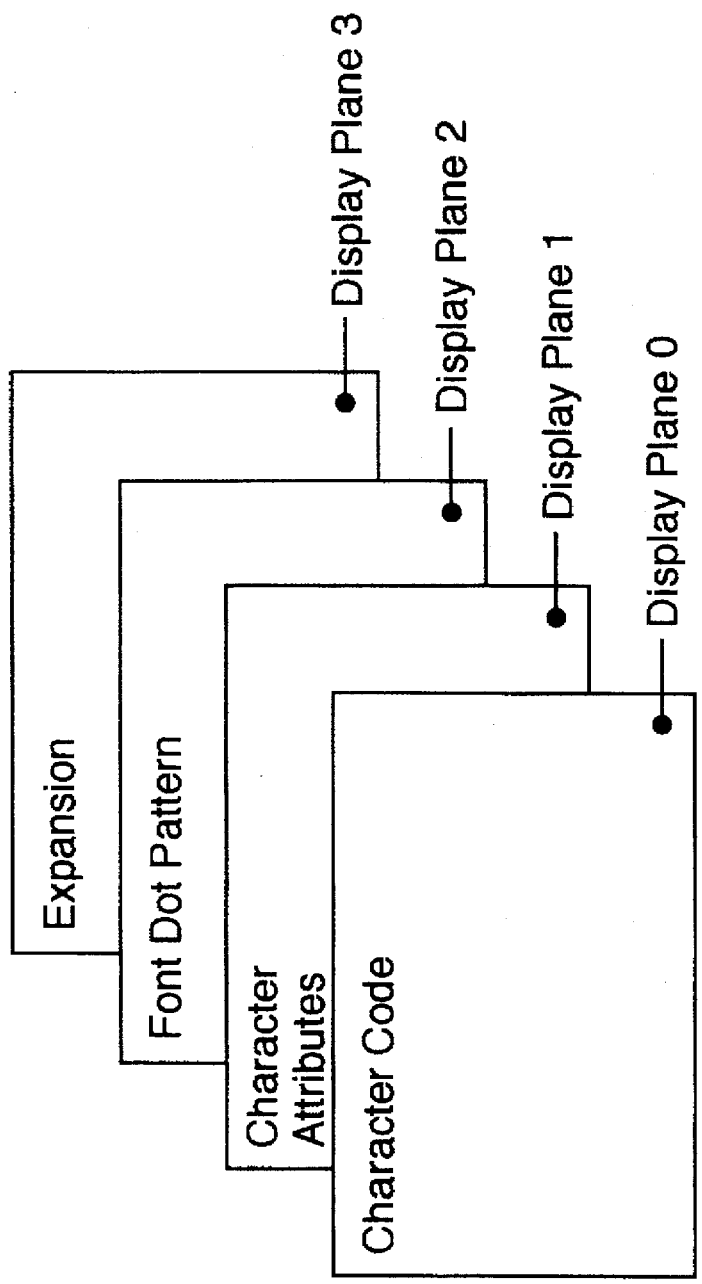
FIG. 2 is a Prior Art memory map for the alphanumeric mode in a video controller.
Figure 3:
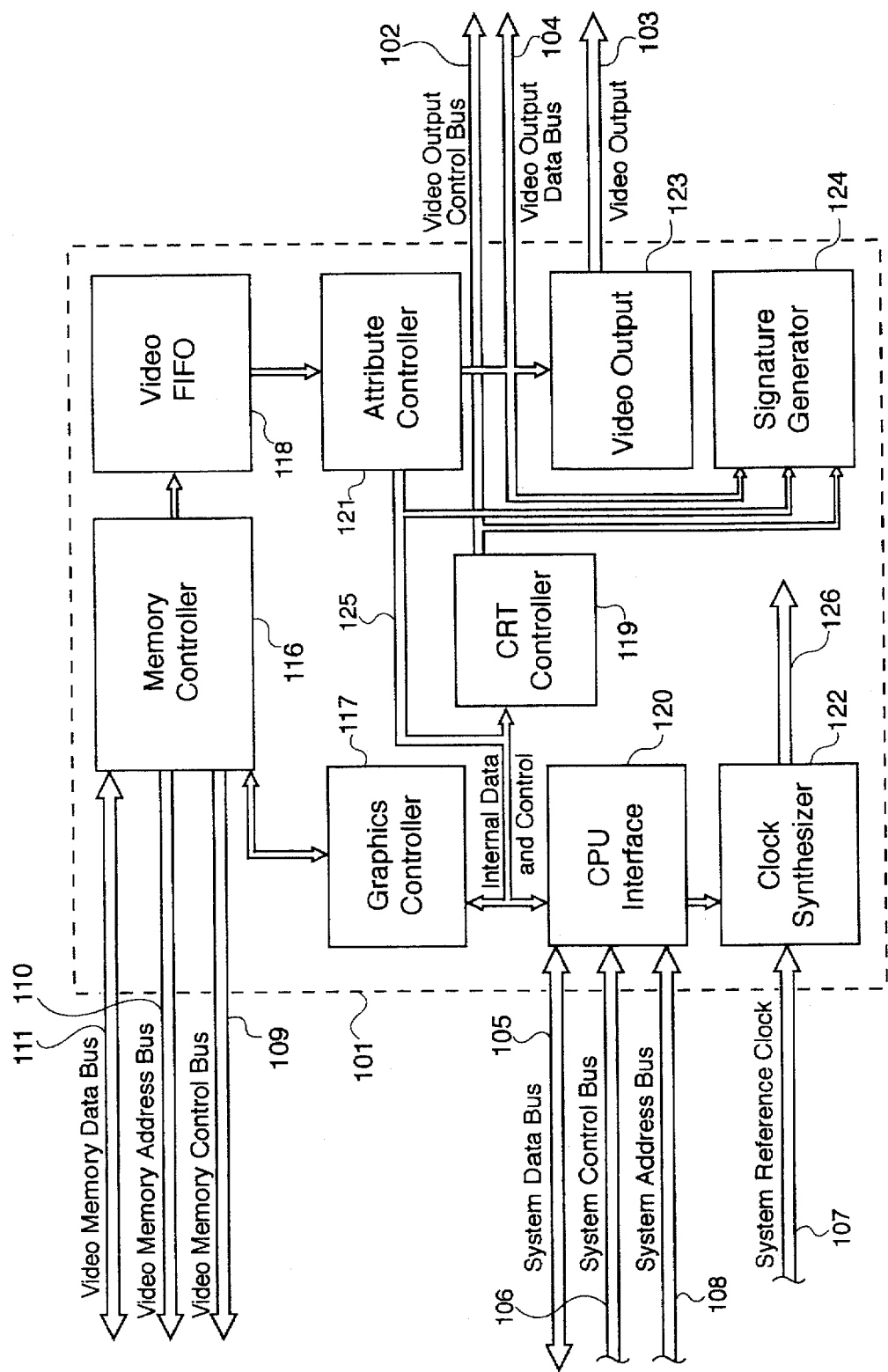
FIG. 3 is a block diagram of a video controller IC.

Thus, for example, for a CPU to write to display memory a new second scan line for the character "A" in a first font, the CPU may generate an address of 0000100000000001. The first portion of the address, font select, may be 000 for the first of eight fonts. The second portion of the address may indicate ASCII code, which for the character "A" may be 64 decimal or 01000000 binary. The last five bits indicate scan line, in this instance, scan line 1, or binary 00001, indicating the second scan line (the first scan line is scan line 0 as indicated in FIG. 1). Using this addressing technique, a host CPU may load, alter, or update character font bit maps in plane 2 of display memory. A prior art VGA controller may retrieve such bit maps in response ASCII data and scan line data to generate a text mode display.

In step 505, after the initial CPU cycle of step 504, the video controller may generate a second "scrambled" address to store the same font data in a second cycle in the off-screen video font cache. Table II illustrates the scrambled address generated in step 505. Such address scrambling may be achieved using combinational or sequential logic circuitry or the like as is known in the art.

equals 2,097,152 bytes or 2 Megabytes). The next five bytes indicate scan line for a given character (with a possible 32 scan lines). The remaining eight bits comprise the ASCII code for a particular character.

Using the example from Table I, an address may be "scrambled" as follows. Assuming a 1 Megabyte display memory, the initial four bits may comprise an offset address for the video font cache and may be stored in a cache font map register. For the sake of example, assume the offset address for the video font cache is binary 1100. Combined with the five scan line bits (00001 representing a second scan line) and the eight ASCII character bits (01000000 representing ASCII character 64—"A") a scrambled address of 11000000101000000 may be generated.

At memory address 11000000101000000 the second scan line for ASCII character 64 may be located. Each memory address for a 64 bit wide DRAM may represent 64 bits, or eight (8) eight-bit bytes. Assuming each scan line is eight pixels in length, up to eight font scan lines may be stored at one address in a 64 bit wide memory. Larger length scan lines may be stored by using pixel compression techniques, or by using wider memories (e.g., 128 bits wide) or by storing a lesser number of fonts in page mode (e.g., six instead of eight).

In step 506, font scan line data is written to the off-screen font cache. In order to select the appropriate byte for writing, the font select bits from the CPU generated address (in our example, the first font, or binary 000) may be used as a byte select to write to the appropriate byte at a particular address in the memory. Font select bits may be used to generate column select or write enable signals CASn(0:7) or WEn (0:7) respectively. In a DRAM, different bytes may be written to during a write operation by designating a corresponding column select or write enable bit or bits. Different types or brands of DRAMs may use CASn(0:7) or WEn(0:7) as byte select mechanisms.

In a 64 bit wide DRAM, up to eight bytes (of eight bits each) at a particular memory address may be read or written to in a single operation. The column select signal CASn(0:7) or write enable signal WEn(0:7) may be selected to allow writing to only one byte of these eight bytes, in effect masking the other bytes at the same memory address. In the present invention, the font select bits may be used to select an appropriate byte for writing font scan line data.

TABLE II

| Scrambled Address | | |
|---|---|---|
| Bit Number | | |
| 17 \| 16 \| 15 \| 14 \| 13 \| 12 \| 11 \| 10 \| 09 \| 08 \| 07 \| 06 \| 05 \| 04 \| 03 \| 02 \| 01 \| 00 | | |
| Font Cache Memory Address 5 bits = 1M 4 bits = 2M | SCAN LINE 5 bits | ASCII CODE 8 bits |

In Table II, portions of the CPU generated address of Table I may be used to generate an address for a paged font in a 64 bit wide video font cache. The video font cache address may be 17 or 18 bits, depending upon the size of the DRAM(s) comprising display memory. For a one Megabyte display memory, four bits may be required to provide a total of seventeen address bits ($2^{17}$ or 131,072 address locations, at eight bytes per address equals 1,048,576 bytes or 1 Megabyte). For a two Megabyte display memory, five bits may be required to provide a total of eighteen address bits ($2^{18}$ or 262,144 address locations, at eight bytes per address The video controller of the present invention thus generates from the CPU generated address, a scrambled address 11000000101000000, and in a subsequent write cycle, writes the same data the CPU writes to plane 2 of the display memory to byte 000 of address 11000000101000000. In this manner, the video font scan lines are stored twice, as in the earlier described embodiment, once in plane 2 of display memory (where traditional VGA controllers store character font bit map scan lines) and once again in the off-screen video font cache. Processing returns to step 501, until a next CPU access is made to plane 2 in text or planar modes.

In the embodiment of the present application, all eight character fonts are stored in the video font cache. Moreover, these fonts are stored as they are received or updated from a host CPU. Thus, no intermediary steps may be required when switching the two active fonts from the eight resident fonts. Moreover, loading or updating of a font by the host CPU may not require a separate set of steps by the video controller.

The process of generating alphanumeric characters using the video font cache is as follows. When generating alphanumeric characters for display on a display screen (e.g., CRT, flat panel display or the like), the video controller of the present invention may fetch one page of the font cache memory in page mode corresponding to the scan line to be scanned to the video display. Since the font bytes are fetched in the page mode, the need for a series of random accesses of the font memory is reduced or eliminated. For the ASCII character byte stored in plane 0 of the display memory, the controller can obtain the correct scan line quad word (i.e., eight bytes, each representing a different font) from the retrieved page of font cache memory.

Primary and secondary font select data, stored in sequence registers in the VGA controller, may indicate which of the eight fonts are primary and secondary fonts, as will be discussed in more detail below. The character attribute byte, retrieved from plane 1 at the same time as the ASCII character byte may indicate which of the eight fonts are font is to be selected (primary or secondary) as well as other character attributes (e.g., foreground, background, underline, reverse video, flash). Since the video controller has retrieved the font character bit map scan line bytes for all eight fonts, the controller can readily select from either primary or secondary font for simultaneous display on a video display.

Figure 6:
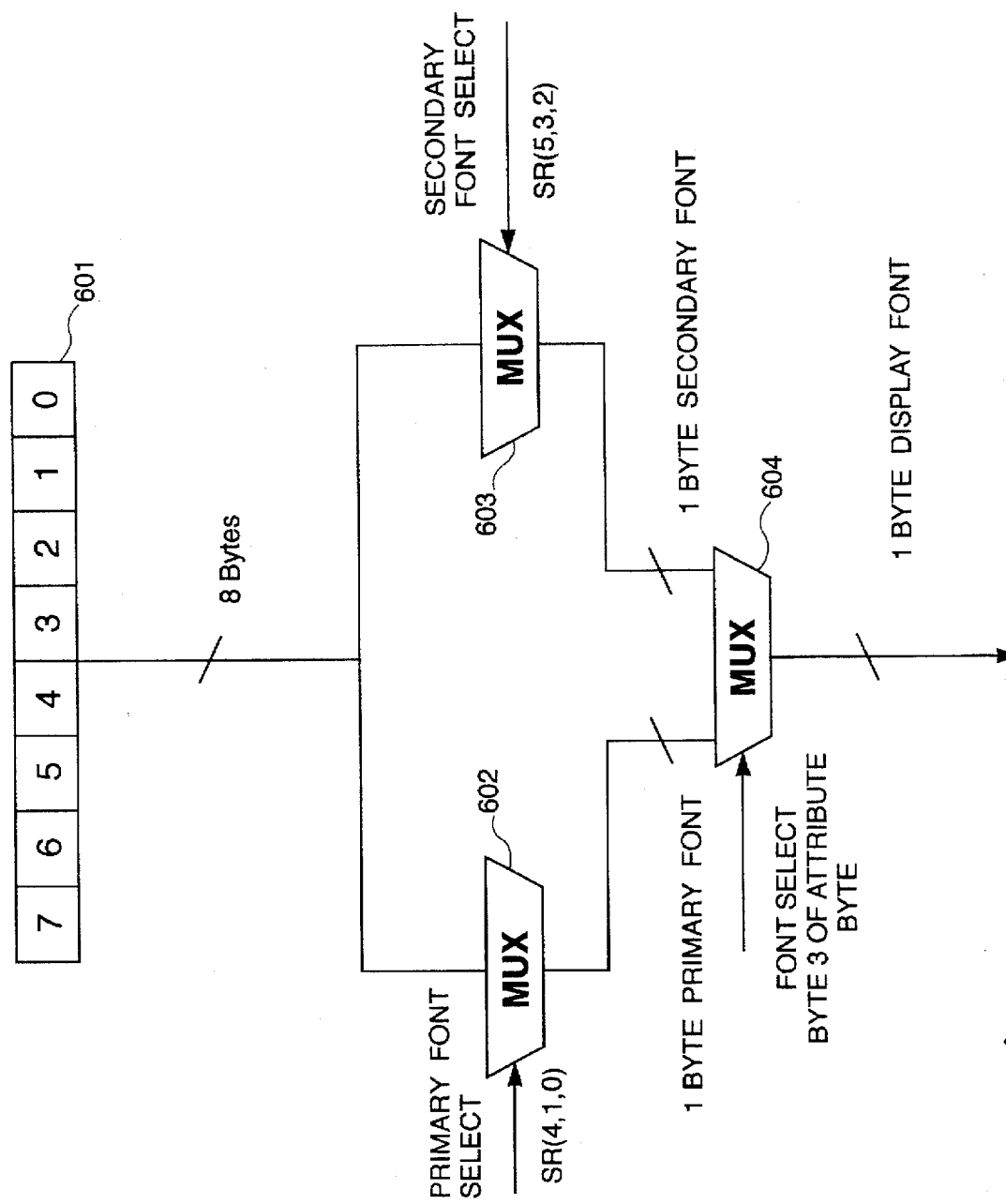
FIG. 6 is a block diagram of an apparatus for retrieving character font bit map scan line data from a 64-bit wide video font cache.

Retrieving character font bit map data from the video font cache may be achieved using the apparatus of FIG. 6. When the VGA controller of the present application generates a video display, it does so on a line by line basis. Thus, for example, a first line of a video display may comprise a series of scan lines (e.g., the first scan lines) for a number of characters. Line counters or the like may keep track of a desired character scan line. ASCII character data may be retrieved from plane 0 of display memory (where it has been previously stored by a host CPU).

Registers within a VGA compatible video controller indicate which of eight possible fonts have been selected as primary and secondary fonts. In particular, in a VGA compatible video controller, bits 4, 1, and 0 of the Sequence Register index 3 (i.e., SR3(4,1,0) ) may be stored with data from a host CPU selecting a primary font. Bits 5, 3, and 2 of Sequence Register index 3 (i.e., SR3(5,3,2) ) may be stored with data from a host CPU selecting a secondary font. The operation of these registers are described on page 355–356 of the *Programmer's Guide to the EGA and VGA Cards*, by Richard F. Ferraro (©1990, Addison-Wesley Publishing Company) incorporated herein by reference. Bit 3 from the attribute byte corresponding to a character may indicate whether the primary or secondary font is selected.

As illustrated in FIG. 6, the video controller of the present invention may retrieve from the video font cache eight bytes of character font bit map scan line data. Each of the eight bytes may represent the same scan line for the same character in one of eight fonts. These eight bytes may be retrieved and stored in a register 601 or the like or may be directly fed to MUXes 602 and 603. MUX 602 may be driven by primary font select bits SR3(4,1,0) and selects from the eight bytes (64 bits) the one byte corresponding to the primary font. MUX 603 may be driven by secondary font select bits SR3(5,3,2) and selects from the eight bytes (64 bits) the one byte corresponding to the secondary font.

MUXes 602 and 603 may be coupled to MUX 604. MUX 604 may be driven by font select bit 3 of the attribute byte corresponding to a character to be displayed. MUX 604 thus outputs the appropriate byte corresponding to the selected primary or secondary font. Thus, for each scan line of each character displayed, all eight font scan line bit maps may be retrieved and the selected font scan line bit map selected using the apparatus of FIG. 6.

As can be readily see from the above description, the apparatus of the present invention may reduce the complexity of the hardware needed to store and select character font bit maps from an off-screen video font cache. Taking advantage of the increased data bandwidth of 64-bit wide DRAMS, the present invention moreover, may improve performance of a video controller by automatically and dynamically loading all eight character font bit maps into the off-screen video font cache. In addition, since all of the eight font scan line bit maps are retrieved for each character scan line, few or no additional steps are required to change from one character font to another.

In the example shown here, only two fonts may be displayed simultaneously in alphanumeric mode, which is a typical requirement for the VGA standard. These two fonts may be selected from one of eight resident fonts, either provided from VGA BIOS or loaded by a user. To select another of the eight fonts, the font select bits of the sequence registers of the VGA controller need only be changed. Thus, for example, when changing primary and/or secondary fonts, it may be unnecessary to require pagination and storage of the "new" fonts in page mode, as all eight fonts are already paginated and stored in the font cache.

Of course, with other memory widths, other features are possible. For example, a memory width of 128 bits (4 quad words) is used, eight fonts may be loaded in page mode, each having 16 bits (2 bytes) per scan line. Other scan line widths, numbers of fonts, and memory widths may be used without departing from the spirit or scope of the invention.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A Video Graphics Array (VGA) compatible graphics controller for receiving alphanumeric character data and generating alphanumeric characters on a video display, said VGA compatible graphics controller comprising:

a display memory having at least four planes, storing alphanumeric character data in a first plane, each of said alphanumeric character data representing at least one character of a character set, storing character attribute data in a second plane, said character attribute data including at least font selection data, and storing two character font bit maps in a third plane, each of said two character font bit maps representing a display font; a video font cache, formed in a fourth plane of the display memory for storing eight character font bit maps in a page mode, wherein said display memory comprises at least one DRAM having a width of at least 64 bits, and said at eight character font bit maps comprise eight character font bit maps, one scan line for one character of each of the eight character font bit maps being stored as a different byte at one memory address in said video font cache;

a display memory controller, coupled to said display memory, said video font cache, and a host CPU, for receiving from the host CPU data representing at least one scan line of a character font bit map and storing the data representing at least one scan line of a character font bit map in a first memory cycle in said display memory at an address indicated by the host CPU, translating the address indicated by the host CPU into a video font cache address, and storing, in a subsequent memory cycle, the data representing at least one scan line of a character font bit map at the video font cache address, said display memory controller receiving font select data as a portion of the address indicated by the CPU and storing data representing at least one scan line of a character font bit map at the video font cache address at a byte selected by the font select data, wherein said address indicated by the host CPU comprises font select bits, character select bits, and scan line select bits, and said video font cache address comprises a video font cache offset address, scan line select bits, and character select bits, said font select bits are used by said display memory controller as a byte select mask to store data representing at least one scan line of a character font bit map at a selected byte in the video font cache at the video font cache address;

a first retrieval means, for retrieving from an address in said video font cache, data representing one scan line for one character for each of said at least two character font bit maps;

primary font selection means, for receiving a primary font selection signal and selecting from said first retrieval means data representing one scan line for one character of a primary font;

secondary font selection means, for receiving a secondary font selection signal and selecting from said first retrieval means data representing one scan line for one character of a secondary font; and display font selection means, coupled to said primary font selection means and said secondary font selection means, for receiving from an attribute byte associated with a character a primary/secondary font selection signal and selecting from said primary font selection means and said secondary font selection means display data representing one scan line for one character of a selected display font.

2. A VGA compatible graphics controller for receiving alphanumeric character data and generating alphanumeric characters on a video display said VGA compatible graphics controller comprising:

a display memory for storing alphanumeric character data, each of said alphanumeric character data representing at least one character of a character set, character attribute data including at least font selection data, and at least two character font bit maps, each of said at least two character font bit maps representing a display font;

a video font cache for storing said at least two character font bit maps in a page mode; and a display memory controller, coupled to said display memory, said video font cache, and a host CPU, for receiving from the host CPU data representing at least one scan line of a character font bit map and storing the data representing at least one scan line of a character font bit map in a first memory cycle in said display memory at an address indicated by the host CPU, translating the address indicated by the host CPU into a video font cache address, and storing, in a subsequent memory cycle, the data representing at least one scan line of a character font bit map at the video font cache address.

3. The VGA compatible graphics controller of claim 2, wherein said display memory controller receives font select data as a portion of the address indicated by the CPU and stores the data representing at least one scan line of a character font bit map at the video font cache address at a byte selected by the font select data.

4. The VGA compatible graphics controller of claim 3, wherein said display memory comprises at least one DRAM having a width of at least 64 bits, and said at least two character font bit maps comprise eight character font bit maps, one scan line for one character of each of the eight character font bit maps being stored as a different byte at one memory address in said video font cache.

5. The VGA compatible graphics controller of claim 2, wherein said address indicated by the host CPU comprises font select bits, character select bits, and scan line select bits, and said video font cache address comprises a video font cache offset address, the scan line select bits, and the character select bits, wherein said font select bits are used as a byte select mask to store the data representing at least one scan line of a character font bit map at a selected byte in the video font cache at the video font cache address.

6. The VGA compatible graphics controller of claim 3, further comprising:

a first retrieval means, for retrieving from an address in said video font cache, data representing one scan line for one character for each of said at least two character font bit maps;

primary font selection means, for receiving a primary font selection signal and selecting from said first retrieval means data representing one scan line for one character of a primary font;

secondary font selection means, for receiving a secondary font selection signal and selecting from said first retrieval means data representing one scan line for one character of a secondary font; and display font means, coupled to said primary font selection means and said secondary font selection means, for receiving from an attribute byte associated with a character a primary/secondary font selection signal and selecting from said primary font selection means and said secondary font selection means display data representing one scan line for one character of a selected display font.

7. A method of receiving alphanumeric character data and generating alphanumeric characters on a video display, said method comprising the steps of:

storing in a display memory, alphanumeric character data, each of the alphanumeric character data representing at least one character of a character set, character attribute data including at least font selection data, and at least two character font bit maps, each of said at least two character font bit maps representing a display font, receiving from a host CPU data representing at least one scan line of a character font bit map, storing the data representing at least one scan line of a character font bit map in a first memory cycle in said display memory at an address indicated by the host CPU, translating the address indicated by the host CPU into a video font cache address, and storing, in a subsequent memory cycle, the data representing at least one scan line of a character font bit map in a video font cache at the video font cache address.

8. The method of claim 7, wherein said address indicated by the host CPU comprises font select bits, character select bits, and scan line select bits, said step of translating comprises generating a video font cache address comprising a video font cache offset address, the scan line select bits, and the character select bits, and said step of storing comprises the step of using said font select bits are as a byte select mask to store the data representing at least one scan line of a character font bit map at a selected byte in the video font cache at the video font cache address.

9. The method of claim 7, further comprising the steps of:

receiving font select data in the display memory as a portion of the address indicated by the CPU, and storing the data representing at least one scan line of a character font bit map in the video font cache at the video font cache address at a byte selected by the font select data.

10. The method of claim 8, wherein the display memory comprises at least one DRAM having a width of at least 64 bits, and said at least two character font bit maps comprise eight character font bit maps, said method further comprising the steps of:

storing one scan line for one character of each of the eight character font bit maps as a different byte at one memory address in said video font cache.

11. The method of claim 8, further comprising the steps of:

retrieving from an address in said video font cache, data representing one scan line for one character for each of said at least two character font bit maps, receiving a primary font selection signal, selecting from said first retrieval means data representing one scan line for one character of a primary font, receiving a secondary font selection signal, selecting from said first retrieval means data representing one scan line for one character of a secondary font, receiving from an attribute byte associated with a character a primary/secondary font selection signal, and selecting from said primary font selection means and said secondary font selection means display data representing one scan line for one character of a selected display font.

12. A VGA compatible graphics controller integrated circuit comprising:

A CPU interface for receiving from a host CPU, alphanumeric character data, each of said alphanumeric character data representing at least one character of a character set, character attribute data including at least font selection data, and at least two character font bit maps, each of said at least two character font bit maps representing a display font, a display memory interface for storing and retrieving said alphanumeric character data in a display memory; and a character font bit map write detector, for detecting attempts by a host CPU to write character font bit map data to the display memory, executing a first write cycle to write character font bit map data to an address in the display memory indicated by the host CPU and executing a second write cycle to write character font bit map data to a video font cache at a video font cache address derived from the address in the display memory indicated by the host CPU.

13. The VGA compatible graphics controller integrated circuit of claim 12, wherein said address indicated by the host CPU comprises font select bits, character select bits, and scan line select bits, and said video font cache address comprises a video font cache offset address, the scan line select bits, and the character select bits, wherein said font select bits are used by said character font bit map write detector as a byte select mask to store the data representing at least one scan line of a character font bit map at a selected byte at the video font cache address.

14. The VGA compatible graphics controller integrated circuit of claim 13, wherein said a character font bit map write detector receives font select data as a portion of the address indicated by the CPU and stores the data representing at least one scan line of a character font bit map at the video font cache address at a byte selected by the font select data.

15. The VGA compatible graphics controller integrated circuit of claim 14, wherein the display memory comprises at least one DRAM having a width of at least 64 bits, and said at least two character font bit maps comprise eight character font bit maps, one scan line for one character of each of the eight character font bit maps being stored as a different byte at one memory address in said video font cache.

16. The VGA compatible graphics controller integrated circuit of claim 15, further comprising:

a first retrieval means, for retrieving from an address in the video font cache, data representing one scan line for one character for each of said at least two character font bit maps;

primary font selection means, for receiving a primary font selection signal and selecting from said first retrieval means data representing one scan line for one character of a primary font;

secondary font selection means, for receiving a secondary font selection signal and selecting from said first retrieval means data representing one scan line for one character of a secondary font; and display font means, coupled to said primary font selection means and said secondary font selection means, for receiving from an attribute byte associated with a character a primary/secondary font selection signal and selecting from said primary font selection means and said secondary font selection means display data representing one scan line for one character of a selected display font.

* * * * *